(12) United States Patent
Smith (10) Patent No.: US 6,702,070 B2
(45) Date of Patent: Mar. 9, 2004

(54) INTEGRATED DRIVE UNIT

(75) Inventor: Ronald E. Smith, Pleasant Lake, IN (US)

(73) Assignee: Auburn Gear, Inc., Auburn, IN (US)

( * ) Notice: Subject to any disclaimer, the term of this patent is extended or adjusted under 35 U.S.C. 154(b) by 87 days.

(21) Appl. No.: 09/802,625

(22) Filed: Mar. 9, 2001

(65) Prior Publication Data

US 2001/0035012 A1 Nov. 1, 2001

Related U.S. Application Data (60) Provisional application No. 60/192,909, filed on Mar. 29, 2000.

(51) Int. Cl.[7] .............................................. F16D 65/00
(52) U.S. Cl. .................. 188/73.2; 188/70 R; 188/72.7; 188/250 H; 188/250 G; 188/475; 188/83
(58) Field of Search ............................ 475/83; 188/170, 188/72.7, 70 R, 73.2, 250 G, 250 B, 251 A, 250 H (56) References Cited

U.S. PATENT DOCUMENTS

| | | | | |
|---|---|---|---|---|
| 3,043,412 A | * | 7/1962 | Bartholomaus et al. ... | 188/70 R |
| 3,586,136 A | * | 6/1971 | Kamman ..................... | 188/152 |
| 3,954,026 A | | 5/1976 | Rittmann et al. | |
| 4,053,036 A | * | 10/1977 | Branham et al. ......... | 188/18 A |
| 4,271,725 A | | 6/1981 | Takao et al. | |
| 4,275,616 A | | 6/1981 | Ehrlinger et al. | |
| 4,351,407 A | | 9/1982 | Call | |
| 4,567,965 A | * | 2/1986 | Woodruff .................... | 188/170 |
| 4,583,425 A | | 4/1986 | Mann et al. | |
| 4,805,744 A | * | 2/1989 | Pringle ....................... | 188/170 |
| 4,874,064 A | * | 10/1989 | Oono .......................... | 188/366 |
| 5,302,160 A | | 4/1994 | Fujioka | |
| 5,385,124 A | | 1/1995 | Hillebrand et al. | |
| 5,391,122 A | | 2/1995 | Forster | |
| 5,398,776 A | | 3/1995 | Forster | |
| 5,858,511 A | * | 1/1999 | Lisowsky ................ | 92/107 M |
| 5,928,099 A | | 7/1999 | Tsunemi | |
| 5,957,251 A | * | 9/1999 | Jones et al. ............. | 188/218 R |
| 6,405,835 B1 | * | 6/2002 | Satou et al. ................ | 188/170 |

* cited by examiner

*Primary Examiner*—Jack Lavinder
*Assistant Examiner*—Bradley King
(74) *Attorney, Agent, or Firm*—Baker & Daniels (57) ABSTRACT

An integrated drive unit having planetary gearing and an annular cone brake element affixed to a hydraulic motor barrel. A brake piston encircles the hydraulic motor barrel and is selectively engageable with the cone brake element to actuate the cone brake element into frictional contact with the spindle of the integrated drive unit to act as a safety/parking brake. The cone brake element is formed of a bronze-type powdered metal of sufficient durability to withstand dynamic braking. The hydraulic motor is selectively connectable to a transmission including planetary gearing. The planetary gearing of the present invention includes a planet gear carrier having carrier pins formed of a relatively low carbon steel and locally hardened over the area on which the planet gears will be supported. In an alternative embodiment, a carrier pins sleeve formed of VESPEL is utilized as the bearing between the planet gear and the carrier pin.

9 Claims, 8 Drawing Sheets

FIG_1

FIG_2

FIG_3

FIG_8

FIG_7A

FIG_7B

INTEGRATED DRIVE UNIT

CROSS-REFERENCE TO RELATED APPLICATION

This application is related to and claims the benefit under 35 U.S.C. §119(e) of U.S. Provisional Application Serial No. 60/192,909, filed Mar. 29, 2000.

BACKGROUND OF THE INVENTION

1. Field of the Invention

The present invention relates to an integrated drive unit, or a wheel drive unit, and more specifically, to an improved integrated drive unit including an improved safety/parking brake and planet gear carrier.

2. Description of the Related Art

Integrated drive units have a single housing containing both a power input device and a transmission. The power input device can be, e.g., a hydraulic motor. Integrated drive units typically utilize axially oriented brake pads to provide a safety/parking brake. In many cases, stacks of interleaved brake discs are employed. When utilized with a hydraulic motor, brakes of this type are typically axially aligned with the motor barrel and extend from the end of the motor barrel opposite the motor pistons. The casing of the integrated drive must be of sufficient length to accommodate this type of a disc brake. Disc brakes of this type typically cannot withstand a dynamic stop, or "drive through." In a "drive through" case where the vehicle is at rest, with the emergency brake in operable (i.e., braking) position, and the vehicle is moved, the friction material will burn off and destroy the brake. Similarly, in an emergency situation when the vehicle is in motion, use of this brake to slow or stop the vehicle will cause its destruction.

Transmissions utilized within an integrated drive can include, e.g., planetary gears having planet carriers with cantilevered pins which rotatably support planet gears. Planet carriers of this type are unitary in construction and are typically forged or cast. Due to the one piece construction, these carriers can only accommodate one gear ratio. Thus, a new carrier is required for each desired gear ratio. Bearings such as, e.g., needle bearings are utilized to allow planet gears to rotate about the carrier pins of a planet carrier. To allow this relative movement without destruction of the pin, a hardened steel sleeve is press fit thereon, with the bearings being placed between the hardened steel sleeve and the planet gear. Fitting a hardened steel sleeve about the carrier pin of the planet carrier adds significant time and cost to the manufacturing process.

What is needed in the art is a safety/parking brake for use with an integrated drive unit which brake lessens the casing space required for the integrated drive unit and which can withstand dynamic braking activity.

What is further needed in the art is a planet carrier having a cantilevered carrier pin on which a planet gear rotates which does not require a hardened steel sleeve to be placed thereon and which will accommodate various gear ratios.

SUMMARY OF THE INVENTION

The foregoing shortcomings of the prior art are addressed by the present invention. The present invention provides an annular cone brake element which is affixed to the hydraulic motor barrel of an integrated drive unit. A brake piston encircles the hydraulic motor barrel and is selectively engageable with the cone brake element. In this arrangement, the integrated drive housing does not require extension to accommodate a plurality of brake pads axially aligned with and extending from the end of the hydraulic motor barrel opposite the hydraulic pistons. The cone brake element of the present invention is formed of a bronze-type powdered metal of sufficient durability to withstand dynamic braking.

The hydraulic motor is selectively connectable to a transmission including planetary gearing. The planetary gearing of the present invention includes a planet gear carrier comprised of a carrier plate having carrier pin bores positioned according to the desired gear ratio into which carrier pins may be placed and thereafter affixed to the carrier plate. The carrier pins of the current invention can be, e.g., laser welded to the carrier plate. The portion of the pin received into the pin bore of the carrier plate is formed of a soft steel to facilitate welding, while the portion of the pin onto which the planet gear will be mounted is locally hardened so as to eliminate the hardened steel sleeve which is utilized with carrier pins of the prior art. In an alternative embodiment, VESPEL sleeves are utilized to provide a bearing surface between the planet gear and the planet carrier. VESPEL is a rigid resin material available from E. I. DuPont de Nemours and Company.

In another form of the current invention, the planet gear carrier is an integral unit having both a carrier plate and a carrier pin formed from a one-piece forging. As described with respect to the two-piece carrier plate/carrier pin configuration, the portion of the pin onto which the planet gear will be mounted is locally hardened so as to eliminate the hardened steel sleeve which is utilized with carrier pins of the prior art. The hardened portion of the carrier pin can be hardened, e.g., by carbonization, or induction hardening. Generally, carbonization will be utilized to locally harden discrete carrier pins utilized with the two-piece carrier plate/carrier pin configuration, while induction hardening will be utilized to locally harden the integral planet gear carrier having both a carrier plate and a carrier pin formed from a one-piece forging. In one alternative embodiment, VESPEL sleeves are utilized in lieu of hardening the carrier pins.

The invention, in one form thereof, comprises an integrated drive unit including a fixed spindle and a rotatable hub connected to a wheel. The drive unit of this form of the current invention includes a hydraulic motor having a hydraulic motor barrel, a gear set selectively driven by the hydraulic motor, with the hub operably coupled to the motor through the gear set, and a cone brake affixed to the hydraulic motor barrel. The cone brake includes a plurality of friction surfaces lying on an exterior frusto-conical surface of the cone brake.

The invention, in another form thereof, comprises an integrated drive unit having an input shaft and a planetary gear set drivingly connected to the input shaft. In this form of the current invention, the planetary gear set includes a sun gear, at least one planet gear drivingly engaged with the sun gear, and a planet carrier rotatably supporting the at least one planet gear. The planet carrier includes a carrier plate, and a discrete carrier pin cantilevered from and affixed to the carrier plate. The carrier pin rotatably supports the planet gear.

The invention, in another form thereof, comprises an integrated drive unit having an input shaft and a planetary gear set drivingly connected to the input shaft. In this form of the current invention, the planetary gear set includes a sun gear, at least one planet gear drivingly engaged with the sun gear, and a planet carrier rotatably supporting the planet gear. The planet carrier of this form of the current invention includes an integral carrier pin which is locally hardened in an area contacting a bearing. The bearing is interposed between the carrier pin and the planet gear.

The invention, in another form thereof, comprises a method of forming a planet gear carrier for a planetary gear set. The method of this form of the current invention includes the steps of: providing a carrier plate having an aperture, providing a carrier pin, inserting the carrier pin into the aperture, and affixing the carrier pin to the carrier plate.

An advantage of the present invention is the ability to lessen the size of an integrated drive unit by utilizing a safety/parking brake which does not axially extend from the hydraulic motor barrel.

A further advantage of the present invention is the ability to provide a safety/parking brake which can withstand dynamic braking activity.

Another advantage of the present invention is the ability to provide a planet gear carrier having a cantilevered pin which does not require a hardened steel sleeve to be affixed to the pin.

Yet another advantage of the present invention is the ability to provide a planet gear carrier able to accommodate various gear ratios.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplifications set out herein illustrates exemplary embodiments of the invention and such exemplifications are not to be construed as limiting the scope of the invention in any manner.

DETAILED DESCRIPTION OF THE INVENTION

Figure 1:
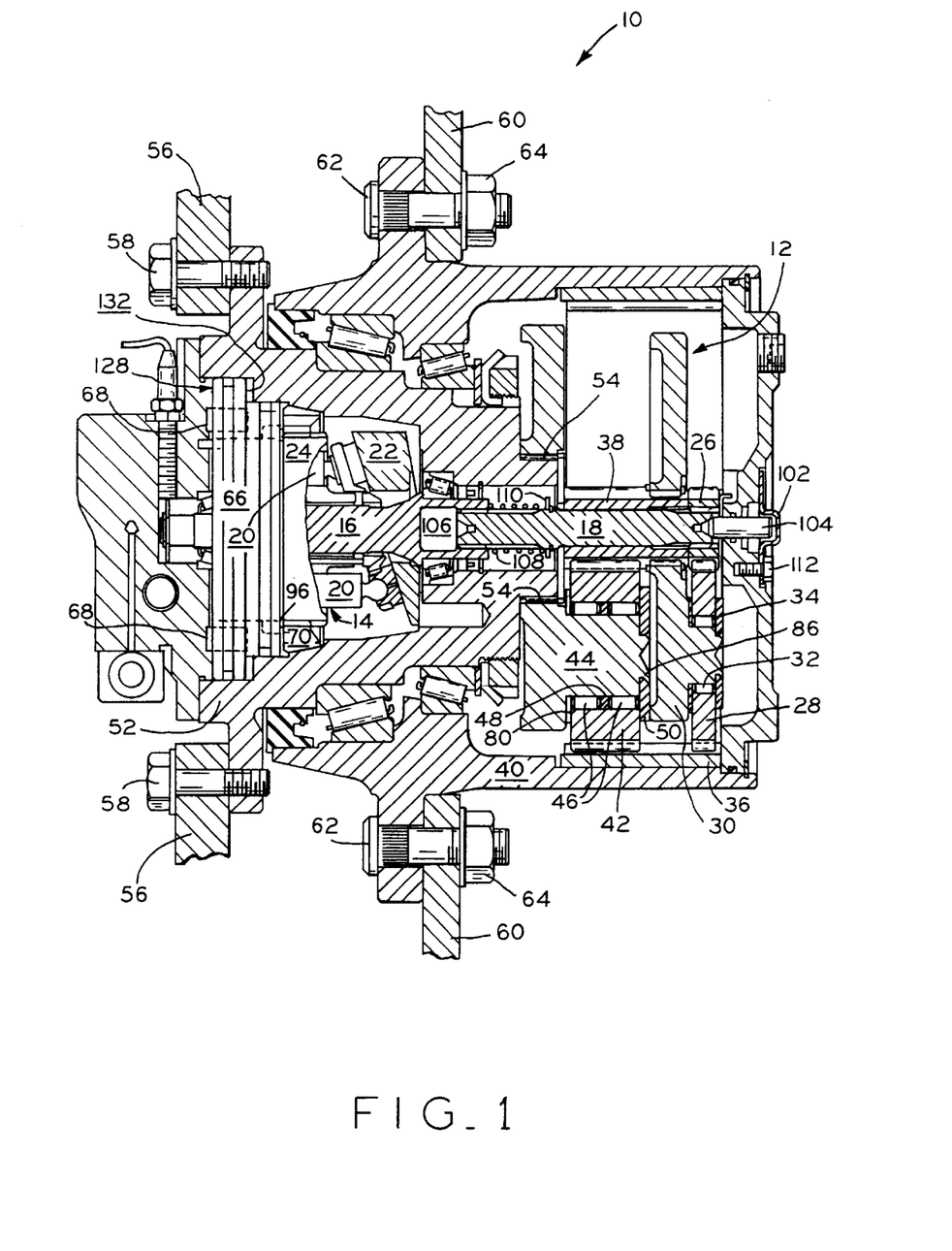
FIG. 1 is a partial sectional view of an integrated drive unit in accordance with the present invention.

Referring now to the drawings and particularly to FIG. 1, an exemplary embodiment of an integrated drive unit in accordance with the present invention is illustrated. Integrated drive unit 10 includes transmission 12 and hydraulic motor 14. Hydraulic motor 14 is selectively connectable, in driving relationship, to transmission 12 via motor output shaft 16 and input shaft 18.

Hydraulic motor 14 is in fluid communication with a hydraulic pump (not shown) installed in a vehicle (not shown) onto which the integrated drive unit, or a plurality of integrated drive units are installed. Motor pistons 20 are hydraulically actuated by the hydraulic pump and function in conjunction with swash plate 22 to provide rotary motion to hydraulic motor barrel 24 as is known in the art. Hydraulic motor barrel 24 is splined to motor output shaft 16. Motor output shaft 16 is further splined to input shaft 18 and input shaft 18 is further splined to primary sun gear 26. In this way, rotary motion of hydraulic motor barrel 24 is transmitted into rotary motion of primary sun gear 26.

Sun gear 26 is disengagable from input shaft 18. To disengage primary sun gear 26, bolt 112 and cover 102 are removed. Cover 102 is rotated 180° and replaced, causing axial movement of plunger 104 and consequently input shaft 18. Input shaft 18 includes spring retainer washer 110 affixed thereto. Spring retainer washer 110 acts against compression spring 108 while input shaft 18 is moved into space 106 and out of splined engagement with primary sun gear 26.

Primary sun gear 26 is in toothed engagement with primary planet gear 28. While only one primary planet gear 28 is illustrated in FIG. 1, multiple primary planet gears (e.g., three or four) can be utilized. Primary planet gears 28 are rotatably supported by primary planet carrier 30, with bearings 32 interposed therebetween. Retaining washer 34 is affixed to primary planet carrier 30 and resists axial movement of primary planet gear 28.

Ring gear 36 is press fit to hub 40 and is in toothed engagement with primary planet gear 28. Rotation of primary sun gear 26 causes rotational movement of primary planet gears 28 about ring gear 36, and, consequently, causes rotational movement of primary planet carrier 30. Primary planet carrier 30 is in splined engagement with secondary sun gear 38. Secondary sun gear 38 includes a clearance hole through which input shaft 18 passes. Secondary sun gear 38 is in toothed engagement with secondary planet gears 42. Again, while only one secondary planet gear 42 is illustrated in FIG. 1, multiple secondary planet gears (e.g., 3 or 4) can be utilized.

Secondary planet gears 42 are rotatably supported by secondary planet carrier 44, with bearings 46 interposed therebetween. Separation washer 48 is placed between axially aligned sets of bearings 46, while retaining washer 50 is affixed to secondary planet carrier 44 and resists axial movement of each secondary planet gear 42. Secondary planet carrier 44 is splined to spindle 52 at location 54, and spindle 52 is affixed to frame 56 of the vehicle via bolts 58. Secondary planet carrier 44 is stationary relative to the vehicle frame and, therefore, rotational movement of secondary planet gears 42 causes rotational movement of ring gear 36 and consequently hub 40 to which ring gear 36 is affixed. Hub 40 is affixed to wheel 60 via bolts 62 and nuts 64, and therefore rotational movement of ring gear 36 is translated into rotational movement of wheel 60.

Hydraulic motor barrel 24 is encircled by annular brake piston 66 and brake piston 66 is operable to move axially with respect to motor barrel 24. Compression springs 94 (FIG. 11) are placed within spring chambers 68 and are operable to bias brake piston 66 into engagement with cone brake element 70. In one exemplary embodiment, twelve springs are spaced about brake piston 66. Cone brake element 70 is splined to hydraulic motor barrel 24, and axial displacement of brake piston 66 against cone brake element 70 effects axial displacement of cone brake element 70 to cause frictional engagement of cone brake element 70 with spindle 52 and thereby impede rotational movement of hydraulic motor barrel 24.

Figure 11:
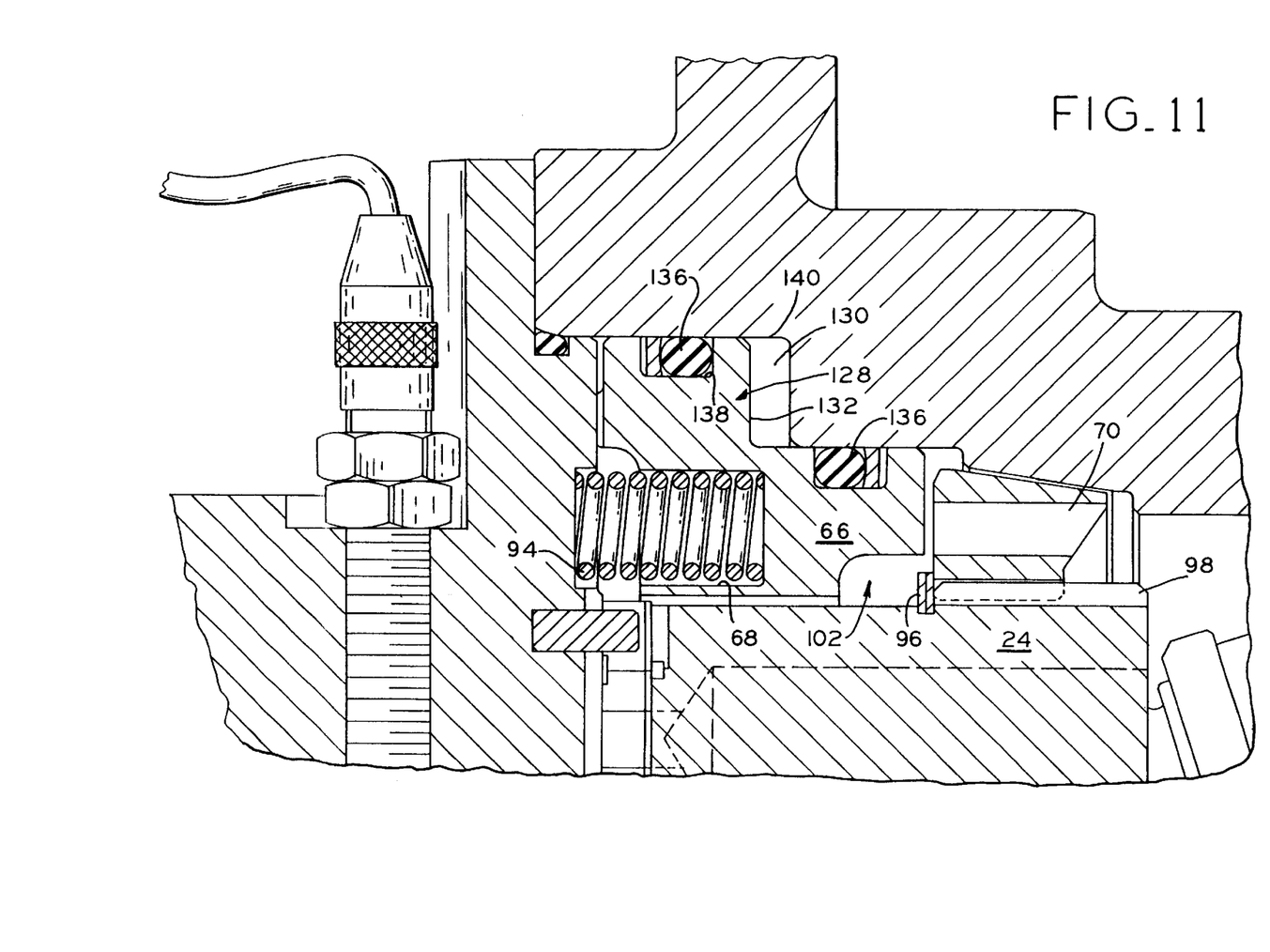
FIG. 11 is an enlarged, fragmentary sectional view illustrating one embodiment of the safety/parking brake of the present invention.
Figure 12:
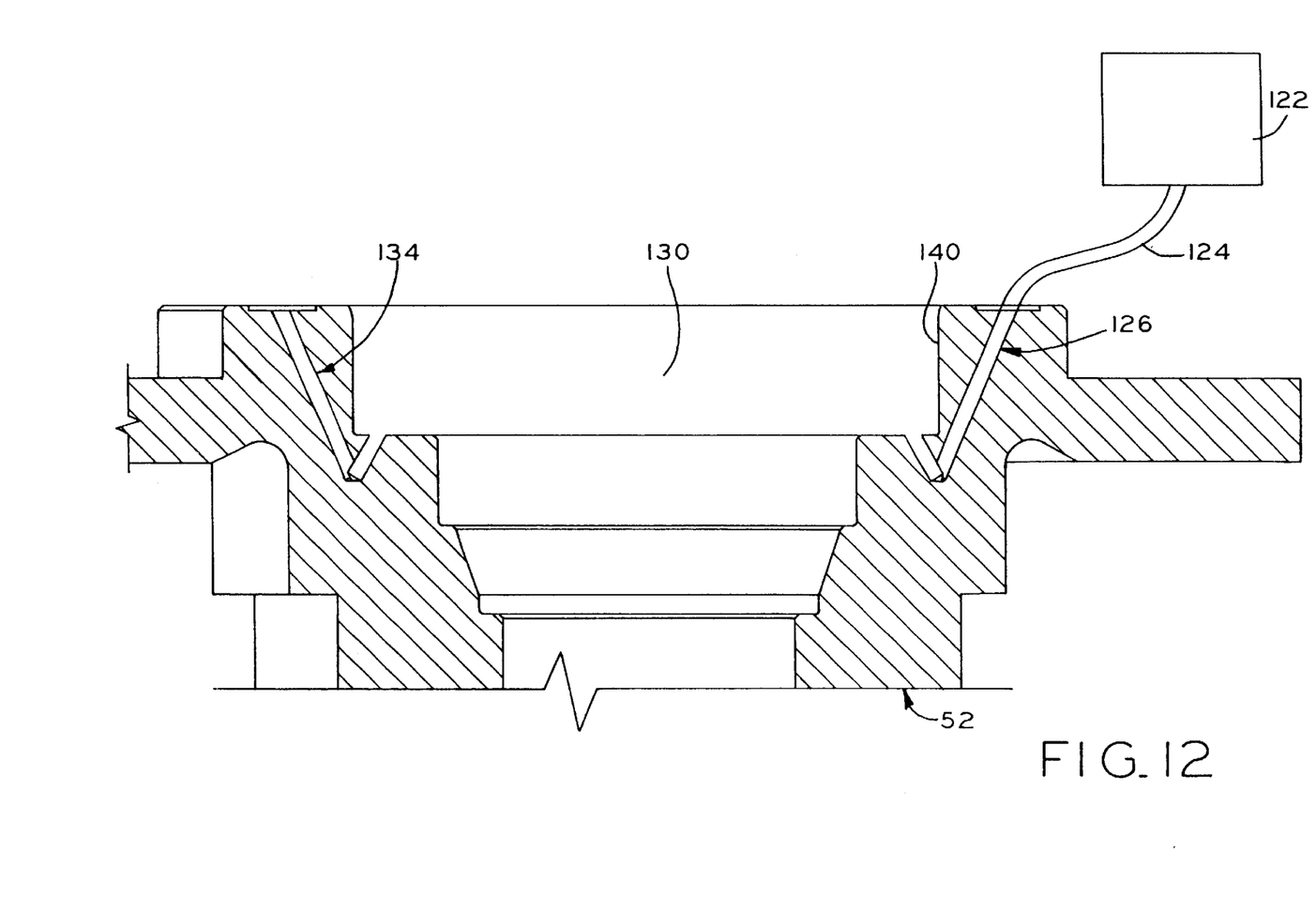
FIG. 12 is a partial sectional view of the spindle of the present invention.

In operation, hydraulic pressure from hydraulic fluid source 122 (FIG. 12) is applied to brake piston 66, and moves brake piston 66 against the force exerted by compression springs 94 and out of engagement with cone brake element 70. Referring to FIG. 12, hydraulic fluid is supplied via fluid line 124 to hydraulic fluid passage 126 disposed in spindle 52. Brake piston 66 includes larger diameter portion 128 (FIGS. 1 and 11) disposed in cavity 130 of spindle 52 (FIGS. 11 and 12). The hydraulic fluid supplied by hydraulic fluid source 122 applies pressure to surface 132 (FIG. 1) of larger diameter portion 128 of brake piston 66 to move brake piston 66 out of engagement with cone brake 70, thus disengaging the safety/parking brake. A second fluid passage 134 is disposed in spindle 52 and serves as an air bleed passage. Although the passages illustrated in FIG. 12 are described as hydraulic fluid passage 126 and air bleed passage 134, either of the passages may be supplied with hydraulic fluid, with the opposing passage acting as an air bleed passage. When motor barrel 24 is at rest, hydraulic pressure is no longer applied to brake piston 66 and compression springs 94 move brake piston 66 into engagement with cone brake element 70 and thereby place cone brake element 70 in frictional engagement with spindle 52 to provide a safety/parking brake.

In one exemplary embodiment, cone brake element 70 is formed from a bronze-type powdered metal. Generally, cone brake element 70 is formed of material having a sufficient coefficient of static friction to resist between 1,500 and 3,000 inch pounds of torque, although the holding torque will vary according to the particular application and, in some cases, will be outside of this general range. Additionally, the material from which cone brake element 70 is formed should be sufficiently durable to withstand dynamic braking activity and thus increase the longevity and usefulness of the brake. Brake piston 66 can be, e.g., formed from an iron casting.

Brake torque supplied by cone brake element 70 is computed according to the following equation:

$$T_B = F_{spring} * r_m * \mu / \sin \phi$$

Where:

$T_B$=brake Torque $F_{spring}$=spring force, i.e., the total force exerted on brake piston 66 by springs 94

Figure 7A:
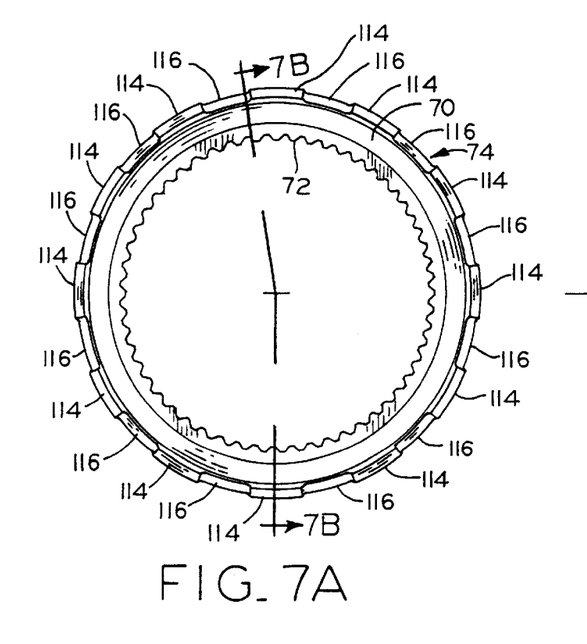
FIG. 7A is an axial, elevational view of a cone brake element of the present invention.
Figure 7B:
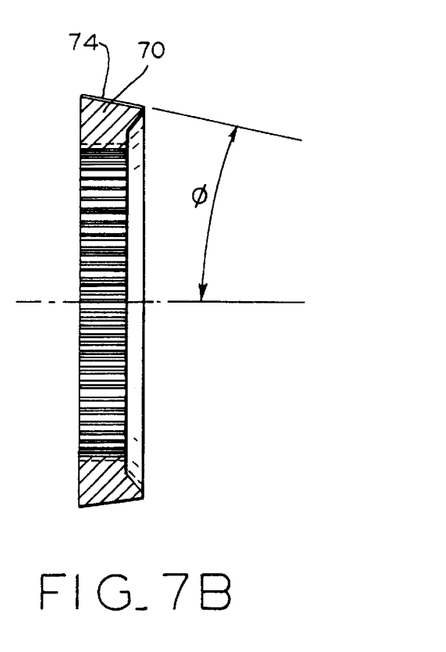
FIG. 7B is a sectional view thereof taken along line 7B—7B.

$r_m$=the mean radius of cone brake element 70
  Where $r_m=(r_1+r_2)/2$ (see FIG. 7B)

$\mu$=the coefficient of friction between cone brake element 70 and spindle 52

$\phi$=the angle formed by the outer portion 74 of cone brake element 70 and it's longitudinal axis Accordingly, brake torque ($T_B$) can be increased by increasing any or all of 1) the spring force ($F_{spring}$), 2) the mean radius of the cone brake element ($r_m$), or 3) the coefficient of friction between the cone brake element and the spindle ($\mu$). Similarly, brake torque can be increased by decreasing the angle ($\phi$) formed by the outer portion of the cone brake element and it's longitudinal axis. Spring force ($F_{spring}$) can be increased by adding springs or by choosing stronger springs.

In one exemplary embodiment, the angle $\phi$ (FIG. 7B) formed by the outer portion 74 of cone brake element 70 and its longitudinal axis is eleven degrees. The angle $\phi$ could be decreased to, e.g., nine degrees to increase the brake torque. Cone brake element 70 is further illustrated in FIGS. 7A, 7B, and 8. As illustrated in FIG. 7A, cone brake element 70 includes an inner diameter having splines 72. Splines 72 mate with splines 98 on the exterior of hydraulic motor barrel 24 (FIG. 11). In one embodiment, cone brake element 70 includes 47 splines 72. As illustrated in FIG. 11, cone brake element 70 is splined to hydraulic motor barrel 24 and retaining washer 96 is operably positioned to limit the axial movement of cone brake element 70. Brake piston 66 includes recess 102 to accommodate retaining washer 96 and prevent contact therewith.

Figure 9A:
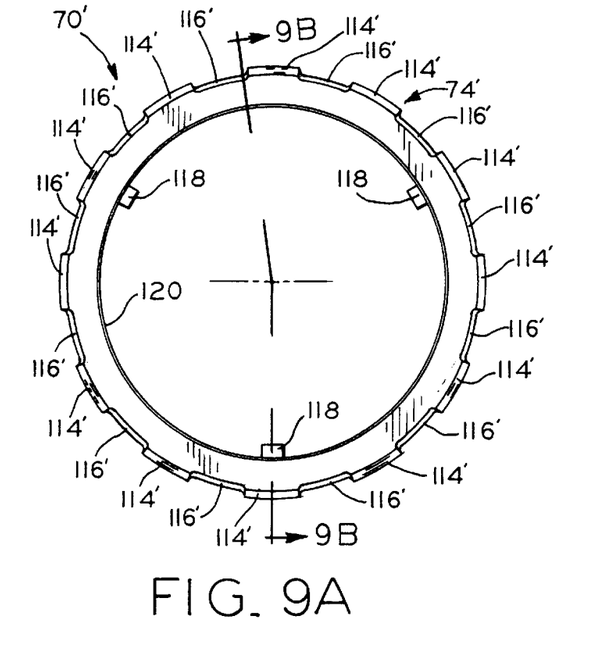
FIG. 9A is an axial, elevational view of an alternative embodiment of the cone brake of the present invention.
Figure 9B:
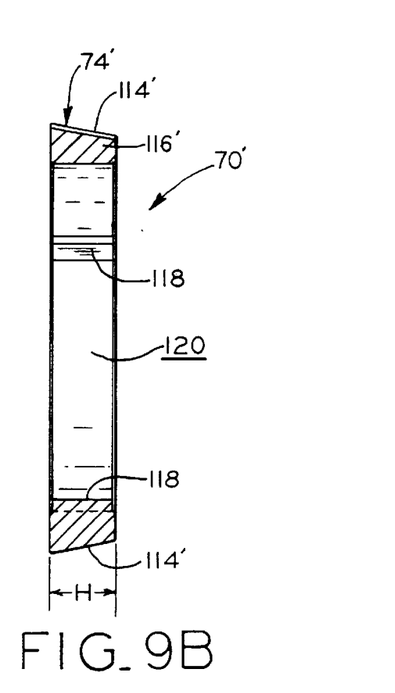
FIG. 9B is a sectional view thereof taken along line 9B—9B.
Figure 10:
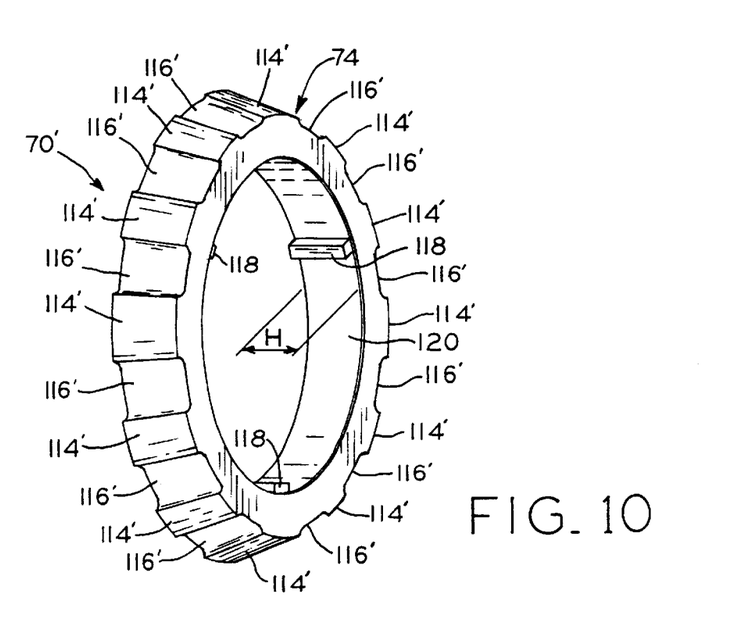
FIG. 10 is a perspective view of the brake element of FIG. 9A.

FIGS. 9A, 9B, and 10 illustrate an alternative cone brake element 70'. Cone brake element 70' includes three key lugs 118 rather than splines 72. Key lugs 118 are equally spaced about the inner diameter of cone brake 70' to engage similarly spaced key-ways (not shown) located in the exterior of hydraulic motor barrel 24. Cone brake 70' has a height 'H' as illustrated in FIGS. 9B and 10. In one exemplary embodiment, key lugs 118 run the entire distance 'H' (FIGS. 9B and 10). Key lugs 118 protrude radially inwardly from inner surface 120 of cone brake 70' and mate with key-ways (not shown) on hydraulic motor barrel 24 to rotationally fix cone brake 70' to hydraulic motor barrel 24.

Figure 8:
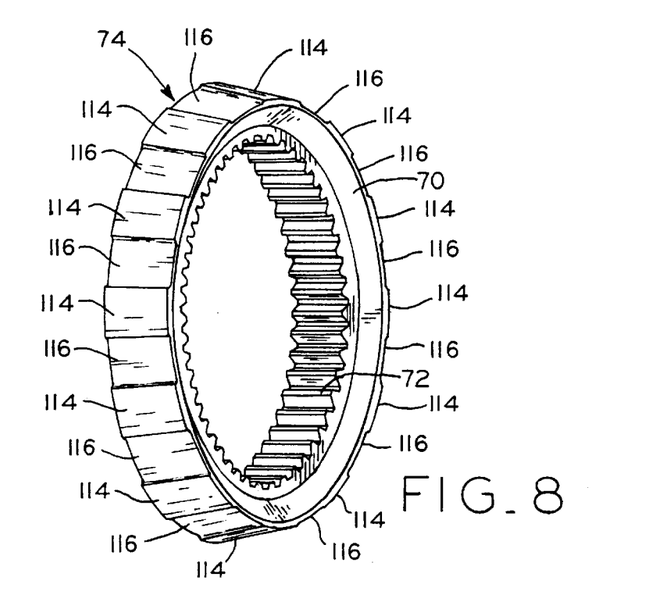
FIG. 8 is a perspective view of the brake element of FIG. 7A.

Referring now to FIGS. 7A, 7B, and 8, outer portion 74 of cone brake element 70 includes pads 114. Pads 114 are formed on the outer frusto-conical surface of cone brake element 70. Pads 114 comprise integral raised friction surfaces which frictionally engage spindle 52 when the brake is engaged. Recesses 116 positioned between pads 114 facilitate passage of oil between cone brake element 70 and spindle 52 (FIG. 1). Similarly, outer portion 74' of cone brake element 70' includes pads 114' with recesses 116' disposed therebetween (see FIGS. 9A, 9B, and 10). U.S. Pat. No. 6,076,644 and U.S. Pat. No. 6,261,202, assigned to the assignee of the present invention, the disclosures of which are herein explicitly incorporated by reference both disclose a cone clutch similar to the cone brake of the present invention.

Figure 2:
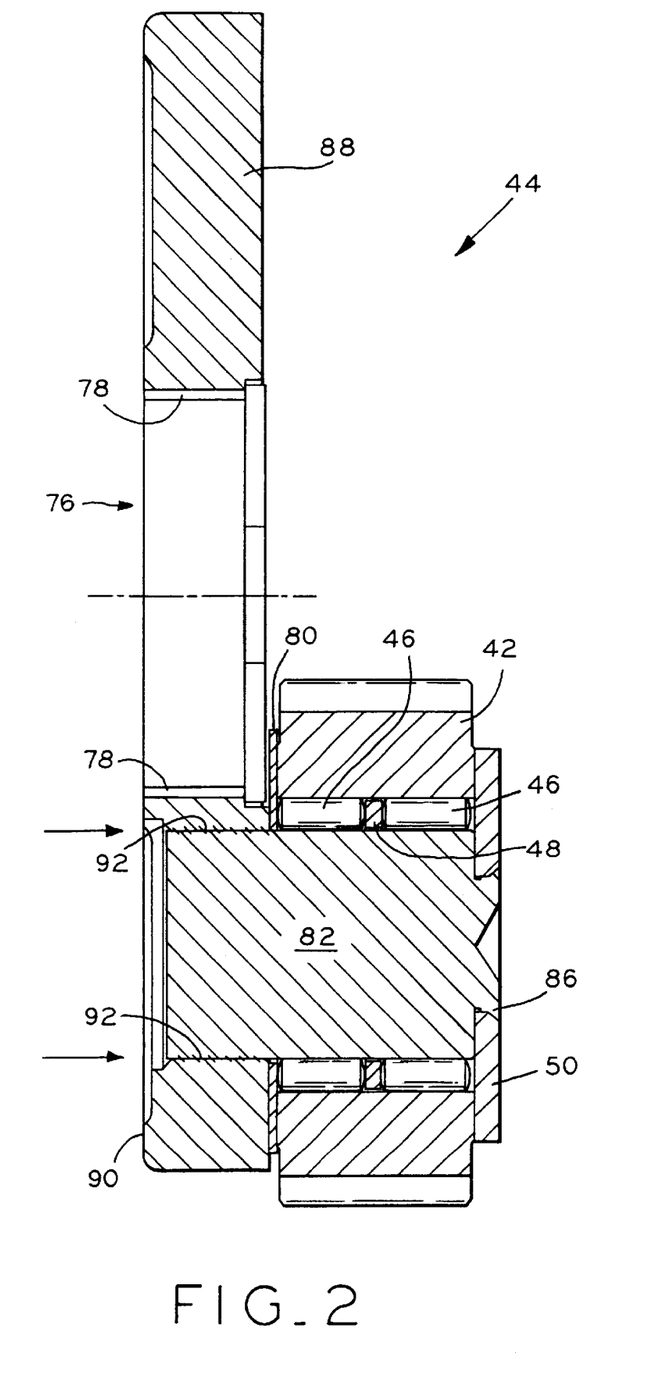
FIG. 2 is a sectional, radial elevational view of a planet carrier and planet gear of the present invention.
Figures 4, 5, 6:
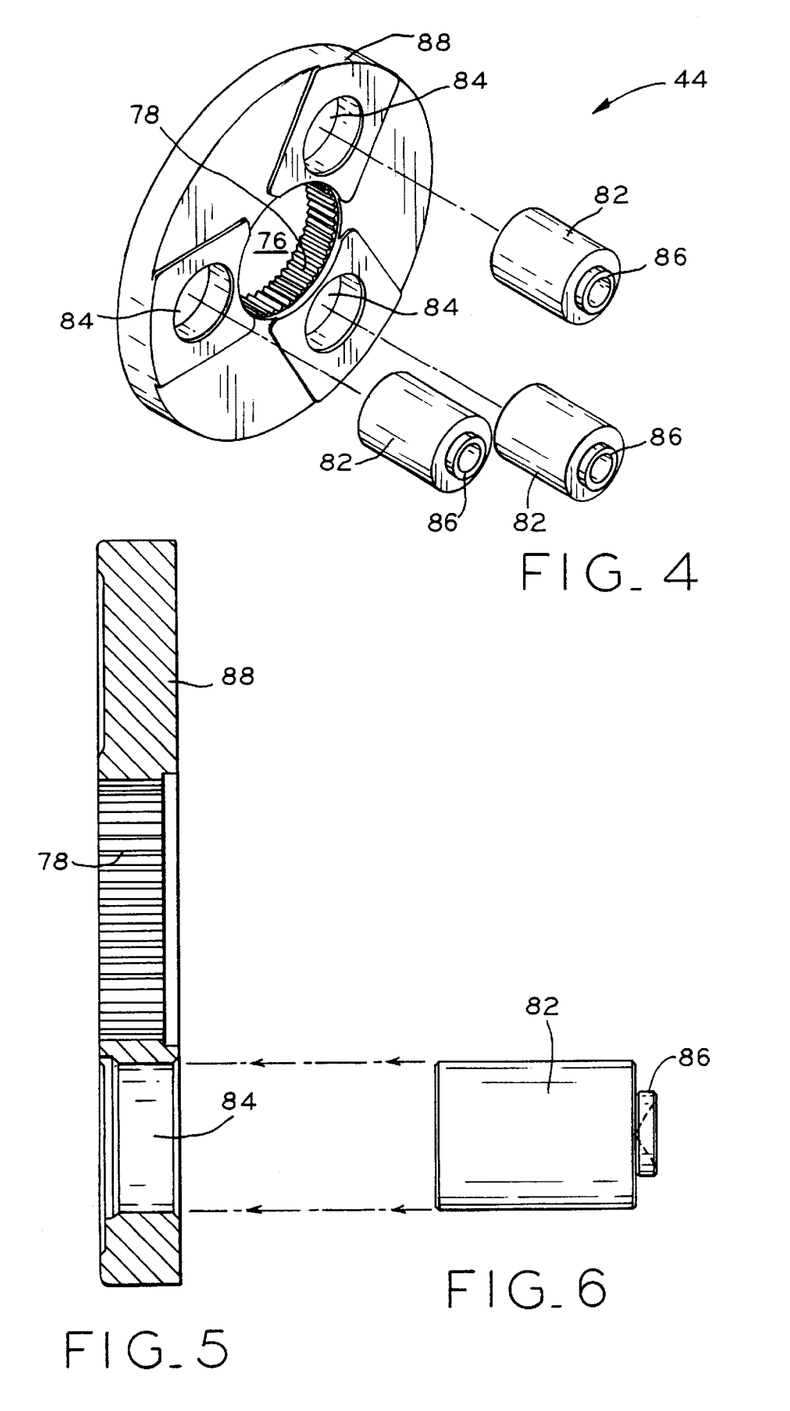
FIG. 4 is an exploded, perspective view illustrating a planet carrier of the present invention.
FIG. 5 is a radial, sectional view of a planet carrier of the present invention.
FIG. 6 is a radial, elevational view of a carrier pin of the present invention.

FIG. 2 illustrates an embodiment of secondary planet carrier 44 in accordance with the present invention. Secondary planet carrier 44 includes carrier plate 88 with carrier pins 82 affixed thereto. Referring now to FIG. 4, carrier plate 88 includes spaced carrier pin apertures 84. Carrier pin apertures 84 may be located at various radial distances from the center of carrier plate 88 to allow for various gear ratios. Carrier pin apertures 84 are sized to receive carrier pins 82, with carrier pins 82 being seated therein as illustrated in FIG. 2. Carrier pin 82 (FIG. 6) is inserted into carrier pin aperture 84 (FIG. 5) and is welded thereto. The portion of carrier pin 82 received in carrier pin aperture 84 is formed of steel having a carbon content low enough to be conducive to laser welding. In one exemplary embodiment, carrier pin 82 is formed of a 20-carbon steel, although carrier pin 82 may be formed from steel having a lower carbon content.

Prior to insertion into carrier pin aperture 84, carrier pin 82 is locally hardened so that the area on which bearings 46 are positioned is harder than the portion received in carrier pin aperture 84. In one exemplary embodiment, carbonization is utilized to locally harden the area of carrier pin 82 on which bearings 46 are placed (FIG. 2). The portion of carrier pin 82 to be received into carrier pin aperture 84 is masked off so as to be unaffected by the carbonization process. After insertion of carrier pin 82 into carrier pin aperture 84, laser welding is utilized to bond carrier pin 82 to carrier plate 88. In one exemplary embodiment, the laser is shot into carrier pin aperture 84 from back face 90 of carrier plate 88. The laser can be shot into carrier pin aperture 84 from various locations including, but not limited to, both the front and back face of carrier plate 88. In one exemplary embodiment, welding is performed over the entire circumference of carrier pin 82 and carrier pin 82 is thus bonded to carrier plate 88 via laser weld 92.

Figure 3:
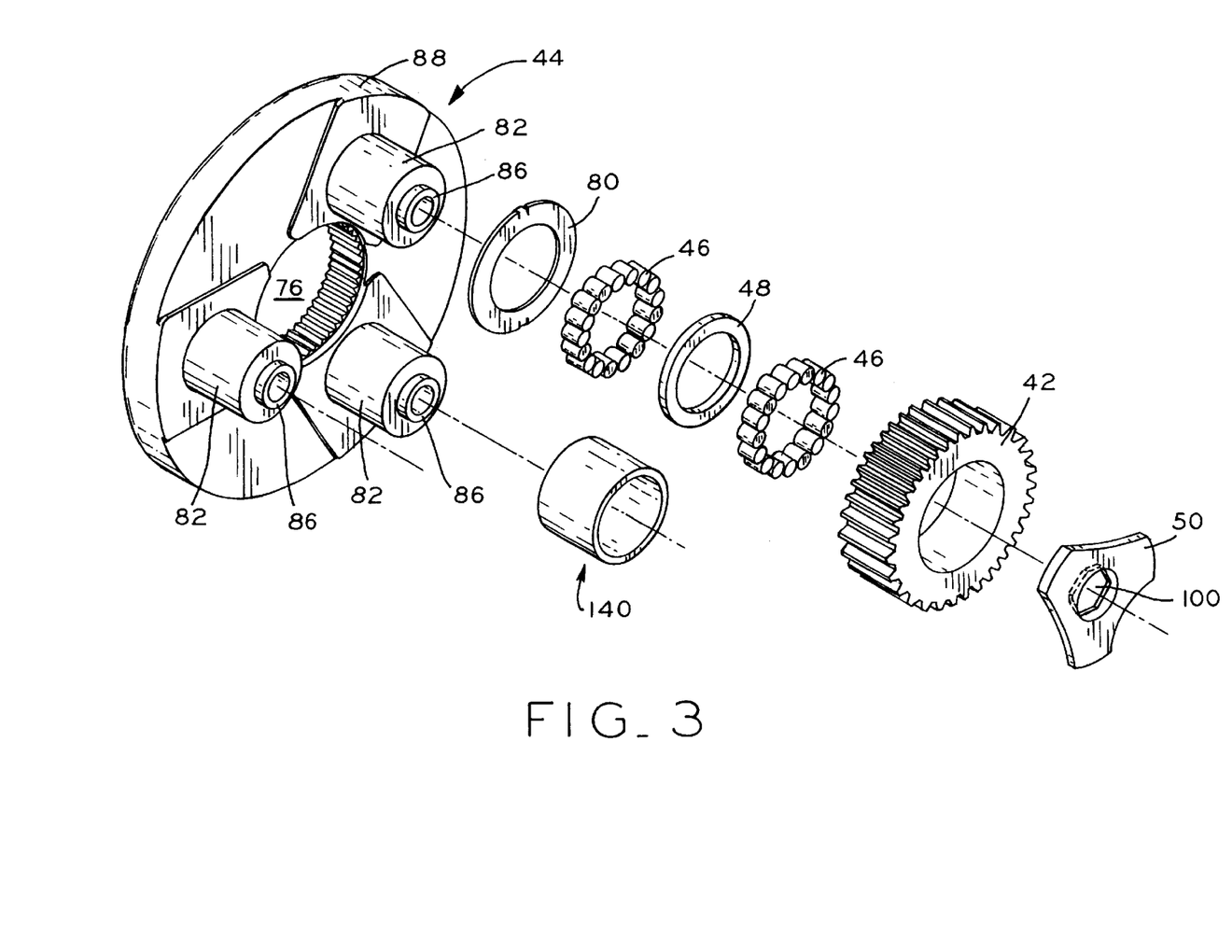
FIG. 3 is an exploded, perspective view illustrating a planet carrier and planet gear in accordance with the present invention.

In one form of the current invention, the planet carrier comprises an integral unit having both a carrier plate 88 and carrier pin 82 as illustrated in FIG. 3. In this form of the current invention, secondary planet carrier 44 is formed as a one-piece forging. Similar to the embodiment described supra, carrier pin 82 is locally hardened in the area on which bearings 46 are positioned. As previously described, induction hardening can be utilized to locally harden the area of carrier pin 82 on which bearings 46 will be positioned.

In another exemplary embodiment, carrier pins 82 are covered by sleeve 140 formed of VESPEL. VESPEL is a rigid resin material available from E. I. DuPont de Nemours and Company. In exemplary embodiments, sleeves 140 are formed from either VESPEL 262 or VESPEL SP-1. VESPEL SP-1 has a Rockwell "E" hardness of 45–60. VESPEL is adequately durable to endure the environment in which carrier pins 82 are disposed. The VESPEL sleeve for a carrier pin may be constructed using any suitable method including, e.g., injection molding. VESPEL sleeves are cheaper to manufacture than the hardened steel sleeves previously utilized and provide flexibility in construction of the planetary gearing. In one exemplary embodiment, a VESPEL sleeve is locked to the inner diameter of the planet gear so that the inner diameter of the VESPEL sleeve will move relative to the carrier pin. In another exemplary embodiment, the VESPEL sleeve is locked to the carrier pin so that the outer diameter of the VESPEL sleeve will move relative to the planet gear rotatably mounted thereon. Finally, the VESPEL sleeve can free float between the planet gear and the carrier pin. If sleeve 140 free floats, a thrust washer will be utilized to limit the axial movement of sleeve 140. In these embodiments, the VESPEL sleeve acts as the bearing between the planet gear and the carrier pin and therefore additional bearings, such as, e.g., a needle bearing are not required.

The following description relates to a construction utilizing locally hardened steel carrier pins. After construction of secondary planet carrier 44 is complete, secondary planet gears 42 and the associated bearings may be operably positioned on carrier pin 82 as illustrated in FIG. 2. As illustrated in FIG. 3, thrust washer 80 is first placed about carrier pin 82, followed by bearings 46, separation washer 48, and another set of bearings 46. Different bearing configurations may be utilized with the teachings of the present invention. After placement of thrust washer 80, bearings 46, and separation washer 48, secondary planet gear 42 is positioned as illustrated in FIG. 2. After placement of secondary planet gear 42, retaining washer 50 is placed about rivet head 86 of carrier pin 82. Rivet head 86 is masked off from the hardening process and therefore retains a low carbon content as with the portion of carrier pin 82 placed within carrier pin aperture 84. Retaining washer 50 is placed about rivet head 86 and rivet head 86 is thereafter deformed to lock retaining washer 50 in place. The low carbon content of rivet head 86 facilitates deformation thereof. As illustrated in FIG. 3, aperture 100 of retaining washer 50 is hexagonal in shape. This shape of aperture 100, which fits about rivet head 86 works to prevent rotation of retaining washer 50. Primary planet carrier 30 can be assembled using similar processes and components as described with respect to the secondary planet carrier 44.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An integrated drive unit including a fixed spindle and a rotatable hub connected to a wheel, said integrated drive unit comprising:

a hydraulic motor including a hydraulic motor barrel, a gear set selectively driven by said hydraulic motor, the hub operably rotatably coupled to said hydraulic motor through said gear set; and a metallic cone brake rotationally fixed to said hydraulic motor barrel, said cone brake having an exterior frusto-conical surface, said surface having a plurality of integral metallic raised friction surfaces separated by recesses.

2. The integrated drive unit of claim 1, further comprising an axially moveable brake piston selectively engageable with said cone brake.

3. The integrated drive unit of claim 2, wherein said brake piston comprises an annular brake piston, and wherein said brake piston encircles said hydraulic motor barrel.

4. The integrated drive unit of claim 2, further comprising:

a plurality of compression springs connected to said brake piston, said compression springs biasing said brake piston into abutting relationship with said cone brake and thereby biasing said cone brake into frictional engagement with the spindle with said friction surfaces frictionally engaging the spindle; and a source of pressurized hydraulic fluid providing hydraulic pressure to move said brake piston against the biasing force of said compression springs and disengage said brake piston from said cone brake.

5. The integrated drive unit of claim 4, wherein said plurality of compression springs comprises twelve compression springs.

6. The integrated drive unit of claim 1, wherein said cone brake includes a plurality of cone brake splines formed on an inner diameter of said cone brake and said hydraulic motor barrel includes a plurality of motor barrel splines formed on an outer diameter of said motor barrel, said motor barrel splines engaging said cone brake splines to rotationally fix said cone brake to said motor barrel.

7. The integrated drive unit of claim 1, wherein said cone brake includes a plurality of lugs formed on an inner diameter of said cone brake and said hydraulic motor barrel includes a plurality of key-ways formed on an outer diameter of said motor barrel, said key-ways receiving said lugs to rotationally fix said cone brake to said motor barrel.

8. The integrated drive unit of claim 1, wherein said cone brake includes three lugs formed on an inner diameter of said cone brake and said hydraulic motor barrel includes three key-ways formed on an outer diameter of said motor barrel, said key-ways receiving said lugs to rotationally fix said cone brake to said motor barrel.

9. The integrated drive unit of claim 1, wherein said cone brake is formed from a powdered metal.

\* \* \* \* \*